N. E. MONTGOMERY.
GRIP CHAIN FOR AUTOVEHICLES.
APPLICATION FILED MAR. 17, 1919.
1,387,429.
Patented Aug. 9, 1921.
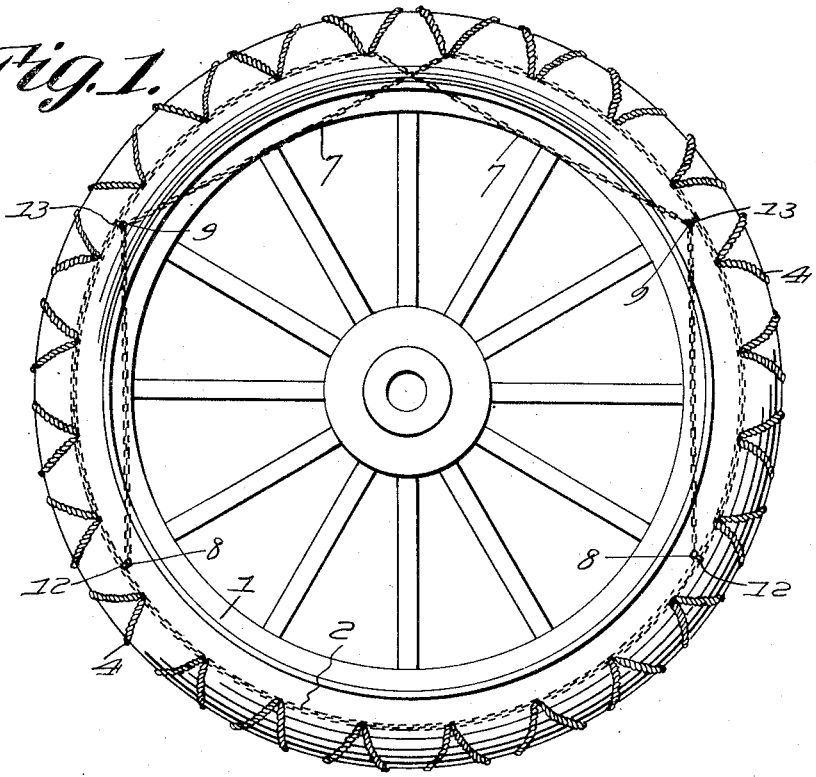
Fig. 1.
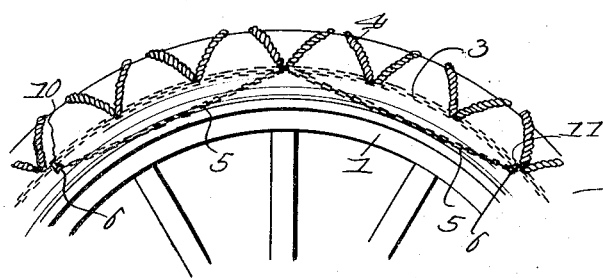
Fig. 2.
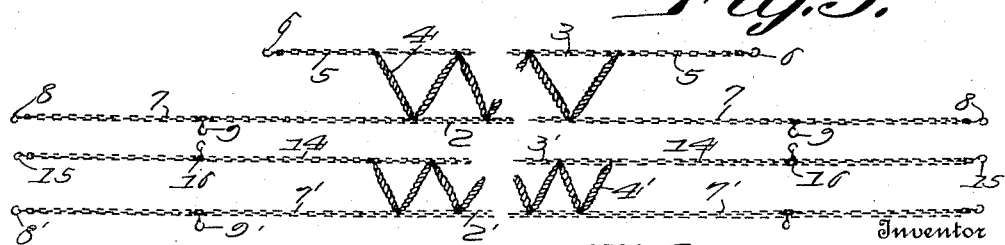
Fig. 3.
Fig. 4.
Inventor
N. E. Montgomery,
By
Attorney

UNITED STATES PATENT OFFICE.

NICHOLAS E. MONTGOMERY, OF BLACKFOOT, IDAHO.

GRIP-CHAIN FOR AUTOVEHICLES.

1,387,429.      Specification of Letters Patent.      Patented Aug. 9, 1921.

Application filed March 17, 1919. Serial No. 283,163.

*To all whom it may concern:*

Be it known that I, NICHOLAS E. MONTGOMERY, citizen of the United States of America, residing at Blackfoot, in the county of Bingham and State of Idaho, have invented new and useful Improvements in Grip-Chains for Autovehicles, of which the following is a specification.

The invention seeks to provide, as its principal object, a grip chain for use in conjunction with auto vehicles, the chain being readily attachable to and detachable from the vehicle tire and being provided with means by which it is secured on the tire and held against lateral displacement thereon. This means comprises side chains to which the usual cross chains are attached and extension chains adapted for interconnection with the side chains so that the cross chains are drawn taut when the device as a whole is attached.

Other and further objects of the invention appear in the following description wherein the invention is set forth in detail.

To the exact construction in which it is shown and described, the invention is not to be restricted. The right is reserved to make such changes or alterations as the actual reduction to practice may suggest, in so far as such changes or alterations are compatible in spirit with the annexed claims.

In the accompanying drawings:

Figure 1 is a view in side elevation showing a motor vehicle wheel with the improved grip chain attached thereto.

Fig. 2 is detailed side elevational view of a portion of the wheel looking at the latter from the side opposite that shown in Fig. 1.

Fig. 3 is a plan view partly broken away of the improved chain detached.

Fig. 4 is a plan view partly broken away of the chain in slightly modified form.

As shown, the invention is applied to a wheel 1 and constitutes the side chains 2 and 3 with the diagonally disposed cross chains 4 connected between the two latter chains. The cross chains 4 are so arranged that alternate chains parallel each other, each cross chain being disposed at an acute angle with reference to the succeeding chain. Thus there are provided two sets of cross chains, the one set being oppositely disposed with reference to the other. The side chain 3 is formed with extensions 5 at each end, these extensions carrying at their terminals the hooks 6. Similarly the side chain 2 is provided with the extensions 7 which are much longer than the extension 5, these latter extensions terminating in the hooks 8 and carrying at intermediate points in their length the hooks 9.

In attaching the improved device to the wheel 1, it is placed on the tire with the cross chains 4 lying across the tread of the tire and the side chain 3 on the inside of the wheel. The length of this side chain 3 is such that the cross chain 4 lying adjacent one end is just adjacent to the cross chain 4 lying at the other end, as shown in Fig. 2. The extension 5 at one end of the side chain 3 is then drawn across the wheel to assume the position of a chord, as indicated in Fig. 2, and its hook 6 is connected into the side chain 3 at the point indicated at 10, this part of the main chain where the snap connects being remote from that portion of which the attendant extension is a part. The opposite extension 5 is similarly connected to the main chain 3 by having its hook engage the latter as indicated at 11. The side chain is thus interconnected around the inside of the wheel. On the outer side of the wheel the extensions 7 are crossed, as indicated in Fig. 1, and their terminal hooks are connected into the side chain 2 as indicated at 12, the extensions 7 thus forming chords across the wheel. The device is then tightened on the wheel by having the intermediate hooks engage the side chain 2 as indicated at 13, when the extensions 7 which formerly assumed the position each of a single chord are made to assume positions where each provides two chords. Thus a tension is created on the extension chains 7 and a tension is also created on the side chain 2, when the device becomes firmly secured to the tire.

In Fig. 4, the modification comprises the replacement of the extension chains 6 with extension chains 14 carrying hooks 15 at their terminals and hooks 16 at intermediate points, so that the side chain on the inside is identical with the side chain on the outside, the extension sections of the two being identical in function.

The invention having been described what is claimed new and useful is:

1. A device of the kind described comprising a pair of side chains, a plurality of cross chains interconnecting the side chains, extension sections carried by the side chains, and fasteners carried at the terminals of the extension sections and at intermediate points thereon, whereby the side chains and cross chains may be disposed around a vehicle tire and the extension sections connected into the side chains by their fasteners so that these extension sections occupy the positions of chords and serve to hold the main chains and cross chains firmly in position on the tire.

2. A device of the kind described comprising a pair of side chains and a plurality of cross chains interconnecting the two, the side chains having extension sections provided with terminal and intermediately positioned fasteners, the extension sections overlapping each other when the device is attached to the tire, the terminal fasteners being engaged with the side chains previous to the intermediate fasteners, whereby tension is created in the side chains in the manner and for the purpose specified.

In testimony whereof he affixes his signature.

NICHOLAS E. MONTGOMERY.